(12) United States Patent
Ryan et al.

(10) Patent No.: US 7,346,086 B2
(45) Date of Patent: Mar. 18, 2008

(54) APPARATUS FOR MONITORING THE OPERATING STATUS OF A LASER

(75) Inventors: Daniel J. Ryan, Sycamore, IL (US); Tom Pienkowski, Hampshire, IL (US)

(73) Assignee: Videojet Technologies, Inc., Wood Dale, IL (US)

(*) Notice: Subject to any disclaimer, the term of this patent is extended or adjusted under 35 U.S.C. 154(b) by 275 days.

(21) Appl. No.: 10/996,641

(22) Filed: Nov. 23, 2004

(65) Prior Publication Data

US 2005/0226288 A1    Oct. 13, 2005

Related U.S. Application Data

(60) Provisional application No. 60/559,315, filed on Apr. 2, 2004.

(51) Int. Cl.
*H01S 3/13* (2006.01)
(52) U.S. Cl. .................. 372/29.02; 372/33
(58) Field of Classification Search .......... 372/29.02
See application file for complete search history.

(56) References Cited

U.S. PATENT DOCUMENTS

| | | |
|---|---|---|
| 3,908,457 A | 9/1975 | Drong et al. |
| 4,242,581 A | 12/1980 | Crow |
| 4,796,996 A | 1/1989 | Burns |
| 4,842,404 A | 6/1989 | Duda |
| 4,871,250 A | 10/1989 | Koseki |
| 5,002,371 A | 3/1991 | Wright |
| 5,172,365 A | 12/1992 | Call et al. |
| 5,233,596 A | 8/1993 | Tani |
| 5,274,622 A | 12/1993 | Kono |
| 5,316,380 A | 5/1994 | Secemski |
| 5,409,314 A | 4/1995 | Laakmann |
| 5,673,282 A | 9/1997 | Wurst |

(Continued)

FOREIGN PATENT DOCUMENTS

| | | |
|---|---|---|
| EP | 1 329 997 | 7/2003 |
| JP | 2000022251 | 1/2000 |

OTHER PUBLICATIONS

International Search Report and Written Opinion for PCT/EP2005/003101, mailed Mar. 23, 2005.

*Primary Examiner*—Dung (Michael) T. Nguyen
(74) *Attorney, Agent, or Firm*—McAndrews, Held & Malloy, Ltd.

(57) ABSTRACT

The present invention provides an apparatus for monitoring a laser. The apparatus includes a plurality of sensors and a monitoring device capable of communicating with the plurality of sensors and configured to monitor an operating status of a laser. The plurality of sensors includes an optical power sensor, a first temperature sensor, and a power sensor and/or a current supply sensor. The present invention also provides a method for monitoring a laser. The method includes measuring an output optical power of the laser, measuring a temperature of the laser and/or a lasing medium exciting device, measuring an amount of current supplied to the exciting device and/or an amount of laser cavity excitation, and determining a current and/or predicted health status of the laser based on at least one of the optical power, the temperature of the laser, the temperature of the exciting device, the current and the driver power.

31 Claims, 4 Drawing Sheets

U.S. PATENT DOCUMENTS

| | | |
|---|---|---|
| 5,710,787 A | 1/1998 | Amada et al. |
| 5,835,476 A | 11/1998 | Yamasaki et al. |
| 5,844,928 A * | 12/1998 | Shastri et al. ............ 372/38.02 |
| 5,986,252 A | 11/1999 | Kawamura |
| 5,995,261 A * | 11/1999 | Asous ........................ 398/182 |
| 6,005,659 A | 12/1999 | D'Alessandro et al. |
| 6,044,329 A * | 3/2000 | Kidd ............................ 702/28 |
| 6,446,867 B1 * | 9/2002 | Sanchez ...................... 235/454 |
| 2002/0190666 A1 * | 12/2002 | Sakamoto et al. .......... 315/291 |
| 2003/0043867 A1 | 3/2003 | Huber et al. |
| 2005/0030540 A1 * | 2/2005 | Thornton .................... 356/432 |
| 2006/0098699 A1 * | 5/2006 | Sanchez ....................... 372/26 |

\* cited by examiner

APPARATUS FOR MONITORING THE OPERATING STATUS OF A LASER

RELATED APPLICATIONS

This application claims the benefit of U.S. Provisional Application No. 60/559,315, filed Apr. 2, 2004, entitled "APPARATUS FOR MONITORING THE OPERATING STATUS OF A LASER" and naming Daniel J. Ryan and Tom Pienkowski as inventors.

FEDERALLY SPONSORED RESEARCH OR DEVELOPMENT

Not applicable.

BACKGROUND OF THE INVENTION

The present invention generally relates to laser systems. Specifically, the present invention relates to a system and method for monitoring the operating status of a laser used in a printing operation.

Current laser marking systems provide limited mechanisms for monitoring an operating health or status of a laser. The lack of feedback on the operating health of a laser often results in a loss of production time as well as the need to discard damaged or incompletely marked product.

Several parameters of a laser are important indicators of the operating health of the laser. For example, the laser output power, or optical power of the laser, is a measurable parameter that can be used to infer the health or status of the laser. A decrease in the sampled optical power may reveal a problem with the laser. Such a decrease may also be used to warn a user of the laser system of a potential problem.

However, monitoring the optical power of a laser alone may be an insufficient measure of the operating status of the laser system. For example, a decrease in the optical power may be caused by a number of problems. Some of the problems may be temporary and require little or no action by a user. Other problems, such as dirty optics of the laser, may indicate a need for maintenance on the laser. Other, more serious problems, such as a change in gas pressure in the laser or a failing radio frequency ("RF") source, may require immediate attention. Any one or more of these problems may be associated with parameters other than the optical power.

Unfortunately, a measurement of a single parameter, namely the optical power of the laser, by itself may not provide sufficient information to ascertain the cause of a problem. To provide useful information on the operating health of the laser, additional parameters must be sensed, measured, and/or monitored. The information obtained from the monitoring of additional parameters can allow for a laser system to warn a user when any number of parameters indicates a problem with the laser. For example, the monitoring may reveal an impending failure of the laser. In addition, the monitoring of parameters may also provide predictions on the future operating health and status of a laser system.

Current laser systems do not include any apparatus or method for monitoring the operating status of a laser. Current apparatuses and methods do not measure sufficient parameters to accurately monitor problems with the laser. In addition, current apparatuses and methods do not provide any prediction of the operating status of a laser. Therefore, a need exists for an apparatus and method for monitoring an operating status of a laser.

BRIEF SUMMARY OF THE INVENTION

The present invention provides an apparatus for monitoring a laser. The apparatus includes a plurality of sensors and a monitoring device capable of communicating with the plurality of sensors and configured to monitor an operating status of a laser. The plurality of sensors includes an optical power sensor configured to measure an optical power of the laser, a first temperature sensor configured to measure one or more of a laser temperature and a lasing medium exciting device temperature, and at least one of a power sensor and a current supply sensor.

The present invention also provides a method for monitoring a laser. The method includes measuring an optical power of the laser, measuring a temperature of one or more of the laser and a lasing medium exciting device supply, measuring one or more of an amount of current supplied to the lasing medium exciting device and an amount of excitation in a cavity of the laser, and determining at least one of a current health status and predicted health status of the laser based on at least one of the optical power, the temperature of the laser, the temperature of the lasing medium exciting device, the current and the amount of excitation.

The present invention also provides a method for predicting an operating health of a laser. The method includes determining a plurality of parameters of the laser and, based on one or more of the parameters, providing one or more of a current and a future operating status of said laser. The parameters include one or more of a laser output power, an amount of laser medium excitation, a current supplied to a lasing medium exciting device, a temperature of the laser, and a temperature of the lasing medium exciting device.

Figure 1:
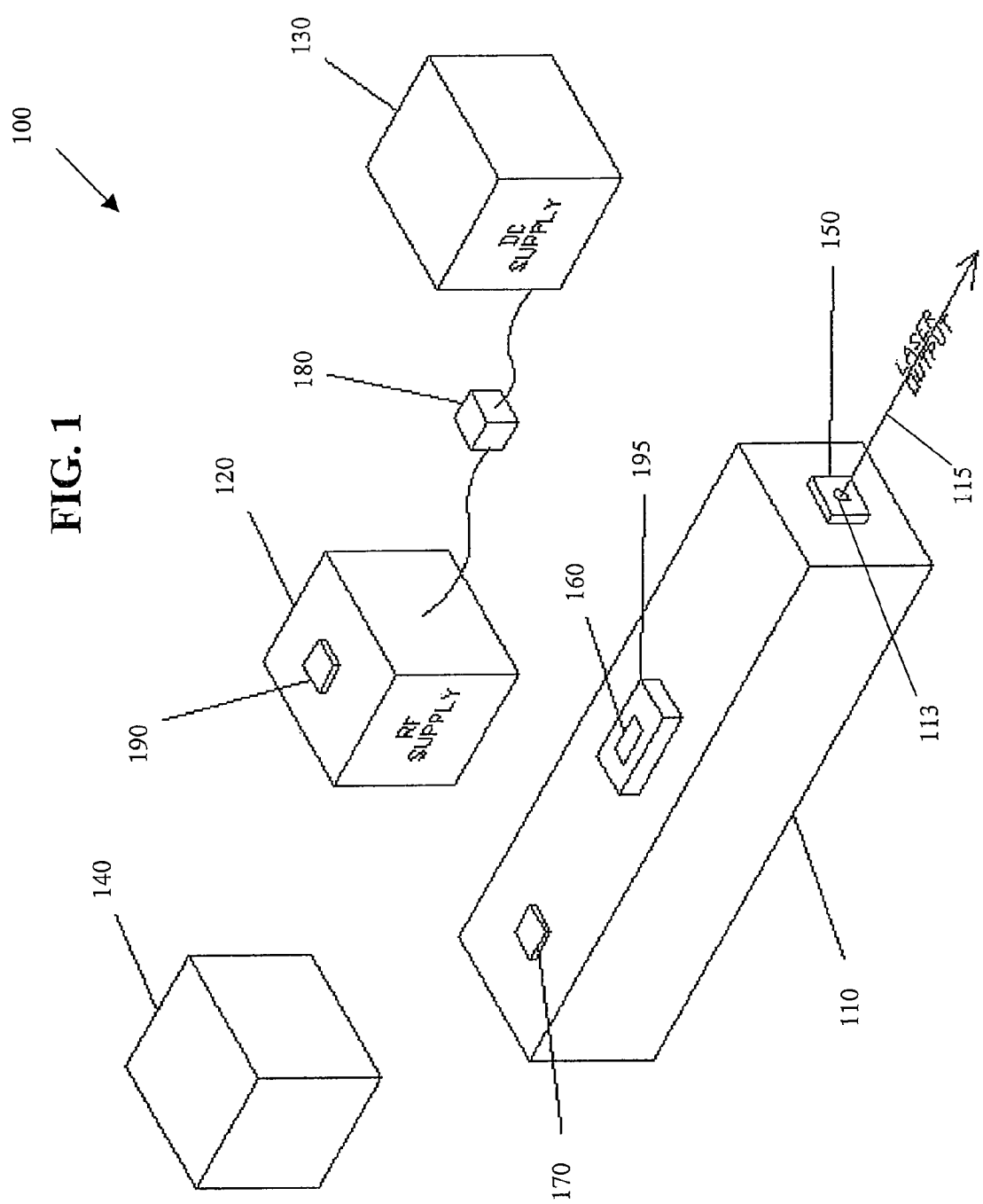
FIG. 1 illustrates an apparatus for monitoring the operating status of a laser according to an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates an apparatus 100 for monitoring the operating status of a laser according to an embodiment of the present invention. Apparatus 100 includes a laser tube 110, a device used to excite a lasing medium ("lasing medium exciting device") 120, a power supply 130, and control electronics 140. Apparatus 100 may be used in a laser marking system, for example.

Power supply 130 is connected to lasing medium exciting device 120 and supplies power to lasing medium exciting device 120. For example, power supply 130 may provide direct electrical current ("DC") to lasing medium exciting device 120. Lasing medium exciting device 120 drives laser tube 110 to produce a laser beam 115. Lasing medium exciting device 120 can include any device that excites a lasing medium in order to produce a laser beam. For example, device 120 can include an RF supply for exciting $CO_2$ in a laser tube 110. Device 120 can also include a flash tube or device that supplies a current to a lasing medium, for example.

Laser tube 110 can include any laser tube capable of producing a laser beam when the laser medium is excited. For example, laser tube 110 can include a $CO_2$ tube. However, in accordance with the present invention, laser tube 110 can include any type of laser. Laser tube 110 transmits a laser beam 115 in a given direction.

Control electronics 140 include any electronic system configured to control the operation of one or more of laser tube 110, lasing medium exciting device 120, and power supply 130. Control electronics 140 may be manually or automatically operated. Control electronics 140 may be in communication with one or more of laser tube 110, lasing medium exciting device 120, and power supply 130.

Apparatus 100 can also include one or more of a plurality of sensors. The plurality of sensors can include an optical power sensor 150, a lasing medium exciting device 120 power sensor ("exciting device power sensor") 160, a laser temperature sensor 170, a lasing medium exciting device 120 current supply sensor ("exciting device current sensor") 180, and a lasing medium exciting device 120 temperature sensor ("exciting device temperature sensor") 190. Apparatus 100 can include any number of the above sensors. In general, apparatus 100 can more accurately monitor the current and future operating health of a laser when a greater number of the above sensors are utilized.

Optical power sensor 150 can include any sensor capable of sampling or configured to sample an output power of a laser. For example, optical power sensor 150 can include a sensor that measures an energy of laser beam 115 and converts the sampled laser beam 115 energy into an electrical signal. Optical power sensor 150 can include any optical sensor with an output that is proportional to a laser beam 115 radiation impinging on sensor 150. For example, optical power sensor 150 can include a photo diode or other semiconductor device. Optical power sensor 150 can be located at an output aperture 113 of laser tube 110. However, optical power sensor 150 can be located in any position that allows sensor 150 to measure the optical power of laser beam 115.

In another embodiment of the present invention, optical power sensor 150 can include a thermal detector. For example, optical power sensor 150 can include a thermal detector such as a thermocouple, thermistor or thermopile that measures the optical power of laser beam 115.

In another embodiment of the present invention, optical power sensor 150 can directly or indirectly measure the optical power of laser beam 115. For example, optical power sensor 150 can measure a portion of a direct laser beam 115 or a sample of a back-scattered laser beam 115.

Exciting device power sensor 160 can include any sensor capable of measuring or configured to measure an amount of excitation in a cavity of laser tube 110. For example, power sensor 160 may measure the power and/or energy supplied to laser tube 110 in order to excite the lasing medium and generate laser beam 115. For example, exciting device power sensor 160 may sense or measure the electric field-strength at a point close to a feed point 195 of laser tube 110. Exciting device power sensor 160 may be located at a feed point 195 of laser tube 110 or at any other position useful to measure the power and/or energy supplied to laser tube 110.

For example, exciting device power sensor 160 can measure a forward RF power flow and/or a reverse RF power flow when an RF supply is used as lasing medium exciting device 120. Exciting device power sensor 160 can include a single sensor that measures both a forward RF power flow and a reverse RF power flow in the RF supply, for example. In an embodiment, exciting device power sensor 160 can include two sensors—a first RF power sensor 160 that measures a forward RF power flow and a second RF power sensor 165 (not shown in FIG. 1) that measures a reverse RF power flow in an RF supply. Using these measurements, exciting device power sensor 160 can also make a relative measurement of the laser tube 110 capacitance.

Exciting device power sensor 160 can include an antenna capable of measuring power and/or energy radiating from laser tube 110. The antenna may then communicate the measured power and/or energy to a diode detector circuit (not shown), for example.

In another embodiment of the present invention, exciting device power sensor 160 can include a bi-directional coupler located in an output circuit of power supply 130. Such a coupler may be capable of measuring a forward and reverse RF fields of an RF supply independently. This capability may allow for apparatus 100 to distinguish between problems associated with an RF supply 120 and laser tube 110, for example. The bi-directional coupler may include a simple wire probe or a stripline coupler in communication with a diode detector circuit, for example. Linear Technology, for example, provides a RF power detector that includes a Schottky diode-peak detector, a signal conditioning amplifier, and control circuitry in a single computer chip.

Laser temperature sensor 170 can include any sensor capable of measuring or configured to measure a temperature of laser tube 110. For example, laser temperature sensor 170 can include a thermometer, a thermocouple, a thermistor, or a thermopile. Laser temperature sensor 170 can be mounted on or near laser tube 110.

Exciting device current supply sensor 180 can include any sensor capable of measuring or configured to measure an amount of current supplied to lasing medium exciting device 120. For example, exciting device current supply sensor 180 can include an inductive current sensor or probe placed on a power line connecting power supply 130 and lasing medium exciting device 120.

In another embodiment of the present invention, exciting device current sensor 180 can include a Hall effect sensor or magnetic resistive sensor placed between power supply 130 and an RF supply 120. In another example, power supply 130 can provide a sense signal in addition to the power that supply 130 provides to lasing medium exciting device 120. The sense signal may include an indication or measurement of the amount of current supplied to lasing medium exciting device 120 by power supply 130. An interpreter (not shown) of the sense signal may then be placed in communication with power supply 130 so as to determine the power supplied to lasing medium exciting device 120.

Exciting device temperature sensor 190 can include any sensor capable of measuring or configured to measure a temperature of lasing medium exciting device 120. For example, RF temperature sensor 190 can include a thermal detector such as a thermocouple, thermistor or thermopile. RF temperature supply 190 can be mounted on or near device 120.

Figure 2:
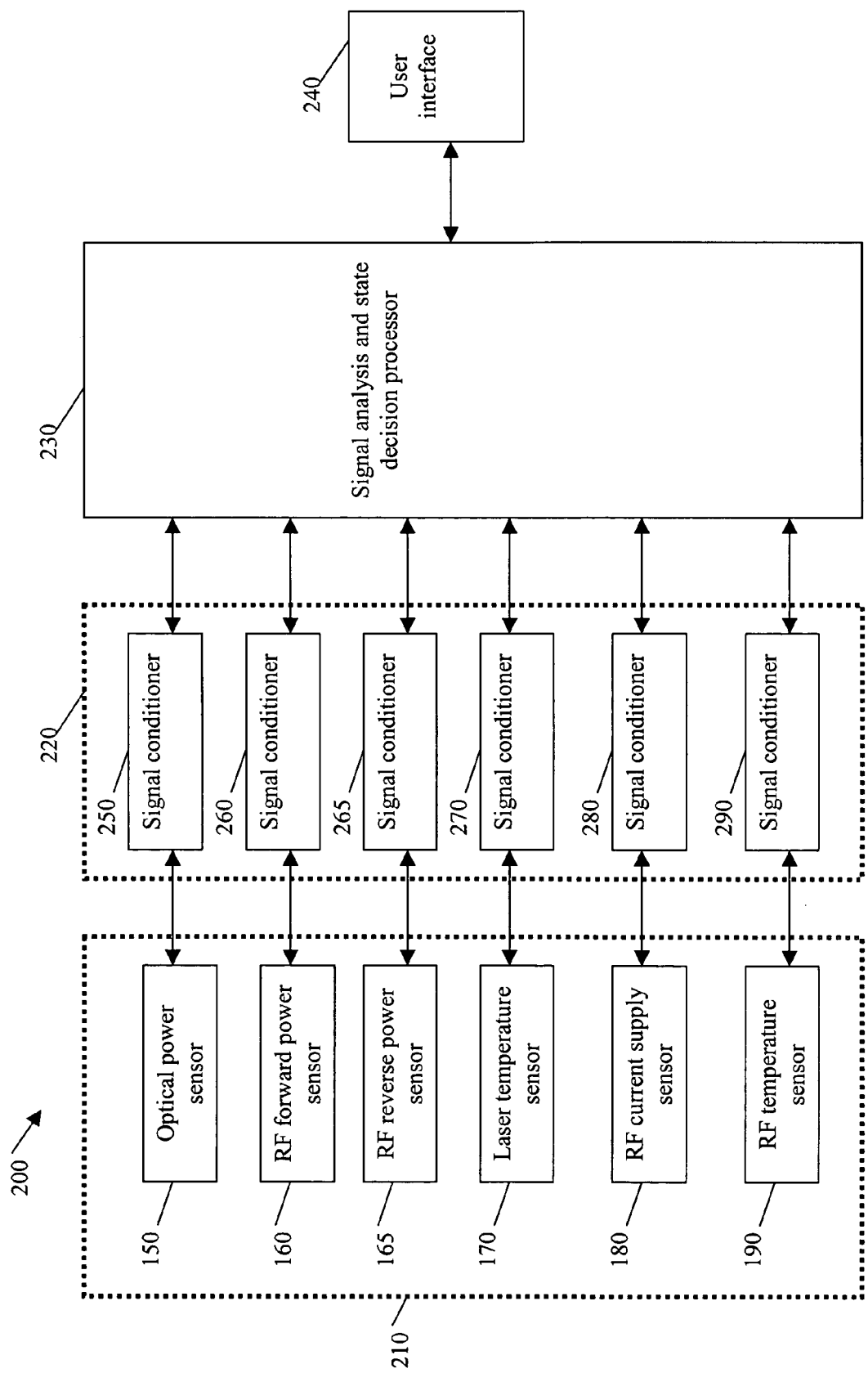
FIG. 2 illustrates a functional block diagram of a sensor output analysis and user output system in accordance with an embodiment of the present invention.

FIG. 2 illustrates a functional block diagram of a laser monitoring system 200 in accordance with an embodiment of the present invention. System 200 demonstrates the manner in which one or more outputs of optical power sensor 150, RF forward power sensor 160, RF reverse power sensor 165, laser temperature sensor 170, RF current supply sensor 180, and RF temperature sensor 190 may be used to measure, estimate and/or predict the operating status of a laser. While both an RF forward power sensor 160 and a RF reverse power sensor 165 are illustrated in FIG. 2, both sensors 160 and 165 may be included in a single RF power sensor 160, as described above. Also as described above, while an RF supply is illustrated in FIG. 2 and described below as the lasing medium exciting device, any device capable of exciting the lasing medium to produce laser beam 115 may be utilized. Similarly, while RF forward and reverse power sensors 160, 165 are illustrated in FIG. 2 and described below, any sensor(s) capable of measuring a power and/or energy supplied to laser tube 110 may be used in place or in conjunction with sensors 160, 165.

System 200 includes four main components: a sensor suite 210, a signal conditioner 220, a signal analysis and state decision processor 230 and a user interface 240. One or more sensors of sensor suite 210 are capable of communication with or configured to communicate with one or more signal conditioners in a set of signal conditioners 220. For example, each sensor in suite 210 may communicate with a signal conditioner in set 220. One or more signal conditioners in the set of signal conditioners 220 are capable of communication or configured to communicate with a signal analysis and state decision processor 230. Signal processor 230 is capable of communication or configured to communicate with a user interface 240.

Communication between any two components of system 200 may occur in any manner known to those of skill in the art. For example, communication between a sensor and a signal conditioner, between a signal conditioner and processor 230, and/or between processor 230 and user interface 240 may occur digitally over a wire or cable. In another example, communication between a sensor and a signal conditioner, between a signal conditioner and processor 230, and/or between processor 230 and user interface 240 may be a wireless communication.

Sensor suite 210 includes any number of the sensors discussed above. For example, sensor suite 210 can include one or more of optical power sensor 150, RF forward power sensor 160, RF reverse power sensor 165, laser temperature sensor 170, current supply sensor 180, and temperature sensor 190. In general, the greater number of sensors used results in greater diagnostic and predictive capability.

As described above, one or more sensors in sensor suite 210 are capable of measuring or configured to measure one or more parameters. Each sensor of suite 210 may communicate a measured parameter or data related to a measured parameter to a signal conditioner in set 220. For example, optical power sensor 150 can communicate a measurement of a laser's output optical power to a signal conditioner 250; RF forward power sensor 160 can communicate a measurement of a forward RF power flow to signal conditioner 260; RF reverse power sensor 165 can communicate a measurement of a reverse RF power flow to signal conditioner 265; laser temperature sensor 170 can communicate a temperature measurement of laser tube 110 to signal conditioner 270; current supply sensor 180 can communicate a measurement of current supplied to device 120 to signal conditioner 280; and temperature sensor 190 can communicate a temperature measurement of device 120 to signal conditioner 290.

Each of signal conditioners 250 through 290 is capable of preparing or is configured to prepare a measured parameter (received from a corresponding sensor in suite 210) for communication to processor 230. In other words, each signal conditioner 250 through 290 receives a signal from a corresponding sensor and prepares the signal, based on the corresponding sensor function, for processor 230. For example, processor 230 may not be capable or configured to receive a measurement obtained by a given sensor in suite 210 directly from the sensor. Therefore, signal conditioners 250 through 290 modify received signals and convert the signals into a format easily readable by processor 230.

Each signal conditioner 250 through 290 can include one or more of an amplifier, a filter and a line driver. An amplifier can include an instrumentation amplifier and/or precision amplifier, for example.

Processor 230 is a highly customizable component of system 200. Processor 230 may act as a device that monitors one or more parameters of a laser system. Processor 230 can be capable of receiving or configured to receive measured parameters (from one or more sensors in set 210) and to communicate some sort of user information or warning signal to user interface 240.

In one embodiment, processor 230 operates in a logic block format. Processor 230 can provide a "go" or "no-go" status on the operating status of the laser. The "go" and/or "no-go" status may be based on at least a comparison between one or more measured parameters and one or more thresholds. For example, processor 230 can include one or more threshold circuits. A threshold circuit can be any circuit that provides a certain output when an input falls below or exceeds a threshold value, or trigger point. For example, a threshold circuit may include a circuit configured to communicate a binary "0" output to user interface 240 when laser temperature sensor 170 provides a measured laser temperature below a threshold temperature. If laser temperature sensor 170 provides a measured laser temperature greater than the threshold temperature, then the circuit may communicate a binary output of "1" to user interface 240, for example.

Processor 230 can include any number of threshold circuits. For example, processor 230 can include a single threshold circuit, a threshold circuit for each sensor in suite 210, or a number of threshold circuits for each sensor in suite 210.

Each threshold circuit in processor 230 can include a single or multiple trigger points. For example, a threshold circuit may include a circuit configured to communicate a binary "00" output to user interface 240 when laser temperature sensor 170 provides a measured laser temperature below a first threshold temperature, a binary "01" output when a measured laser temperature exceeds the first threshold temperature but falls below a second threshold temperature, and a binary "10" output when a measured laser temperature exceeds the second threshold temperature.

The output of a threshold circuit does not need to be limited to a logical or binary-type of output. In another example, a threshold circuit may provide a visual or audible output based on a comparison between a measured parameter and one or more threshold, or trigger, points.

In another embodiment, processor 230 can include one or more computer microprocessors. The microprocessor(s) can receive measured parameters, or data, from one or more sensors in suite 210 and record this data over a time period. The microprocessor(s) can then employ any applicable mathematical and/or statistical analysis to diagnose or predict the operating health of a laser. For example, processor 230 can perform a statistical analysis such as a running mean and variance and/or a windowed mean and variance on one or more parameters. The data resulting from the statistical analysis can then be used to diagnose the current health as well as predict the long-term health of the laser. For example, sequential decreases in the windowed mean could be an indicator of an imminent failure. The prediction or diagnostic can then be communicated to user interface 240.

Once processor 230 receives one or more measured parameters and performed some analysis and/or comparison of the parameter(s), processor 230 communicates an output to user interface 240. As described above, the output can include the measured parameter itself, a series of measured parameters over time, or any other sort of output, such as an indication that a parameter exceeds a threshold, for example. In addition, the output can include the data used to generate a graphical representation of measured parameters, an analysis of measured parameters, and/or a prediction of the operating health of the laser. The output can also include a signal warning a user of an error, problem, or imminent failure of the laser system.

Processor 230 can use measured parameters (obtained by one or more of sensors in suite 210) in a diagnostic or predictive analysis of the operating health of a laser. For example, processor 230 may examine laser output power (obtained by optical power sensor 150) and a power and/or energy supplied to laser tube 110 (for example, an RF power obtained by RF power sensor 160) to diagnose the operating status of a laser. For example, processor 230 may receive a laser output power measurement and determine whether the measurement is high, normal or low. Similarly, processor 230 may receive an RF power measurement and determine whether the measurement is high, normal or low, for example. Processor 230 may then compare these two measurements to the following status truth table to determine a diagnostic status of the laser:

| Laser Output Power | RF Power | Diagnostic Status |
|---|---|---|
| Normal | Normal | O.K. |
| Low | Normal | Check optics |
| High | Normal | O.K. |
| Normal | Low | O.K. |
| Low | Low | Check RF supply |
| High | Low | O.K. |
| Normal | High | Check laser and matching network |
| Low | High | Check laser |
| High | High | Check RF supply and laser temperature |

In another example, processor 230 may monitor parameters measured by optical power sensor 150, RF power sensor 160 and supply sensor 180 to determine the capacitance of the laser. Processor 230 may examine trends in any one or more of the parameters. In other words, processor 230 may determine whether any one of the parameters has decreased or increased in value over time. Using this data, processor 230 may provide a diagnostic on the capacitance of the laser by consulting the following table, for example:

| Laser Power | RF Power | RF Current Supply | Laser Capacitance |
|---|---|---|---|
| ↓ | ↓ | No change | Less capacitance |
| ↓ | No change | ↓ | More capacitance |

Processor 230 may indicate the presence of a negative diagnostic or prediction of laser health by communicating an error signal to user interface 240. In an embodiment of the present invention, the analysis of data by processor 230 is such that the probability of a false-negative or false-positive error signal generated by processor 230 is minimized. Analyzing data on a long-term basis and on a time-windowed or short-term basis, for example, may help to reduce this probability. For example, processor 230 may be programmed to calculate the running mean and variance of one or more measured parameters, such as laser output power. Such a running mean and variance may initially be sensitive to sudden variations in laser output power. However, this sensitivity may be desired in some situations. For example, such sensitivity may be desired during the initial start of a laser in an effort to catch "infant mortality" failures of the laser. As the running time of the laser increases, this sensitivity may decrease. This decrease in sensitivity may also be desired as sudden changes in laser output power become less significant with increased running time.

In order to increase the sensitivity of processor 230 to gradual changes in a measured parameter, processor 230 may also calculate a windowed mean and variance. The windowed mean and variance calculations may be used as temporal snapshots of the operating health of the laser. Collecting successive snapshots can provide processor 230 the ability to sense increasing or decreasing trends in the measured parameter and the rate of the increase or decrease. The rate of increase or decrease in a measured parameter can provide a predictive measure of the lifetime of the laser.

Figure 3:
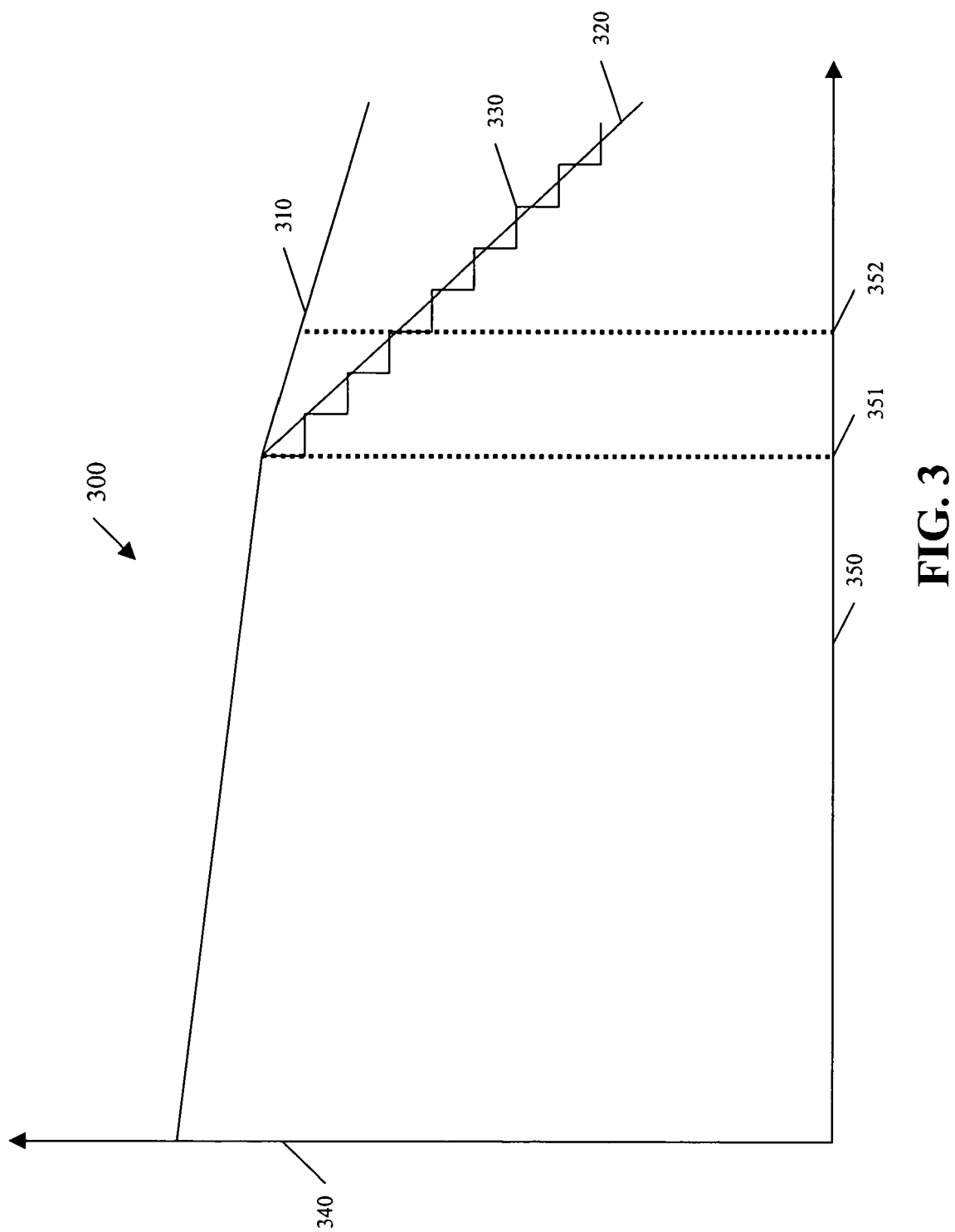
FIG. 3 illustrates a graph of the tracking of a measured parameter, a calculated running mean of a measured parameter, and a time-windowed calculated mean of a measured parameter versus time in accordance with an embodiment of the present invention.

FIG. 3 illustrates a graph 300 of the tracking of a measured parameter, a calculated running mean of a measured parameter, and a time-windowed calculated mean of a measured parameter versus time in accordance with an embodiment of the present invention. Graph 300 includes two axes: a measured parameter axis 340 and a time axis 350. Graph 300 also includes three curves: a curve 310 representing a calculated running mean of a measured parameter ($\mu$), a curve 320 representing the measured parameter, and a curve 330 representing a time-windowed mean of the measured parameter ($\mu_w$). Processor 230 can employ an algorithm to determine an output to be communicated to user interface 240. The algorithm could include the following rules, for example:

1) If $\mu_w < \mu$, then communicate a caution or error signal to user interface 240.
2) If $\mu_{w(n)} < \mu_{w(n-1)} < \mu_{w(n-2)}$ (signifying successive decreases in a time-windowed mean), then communicate a warning of impending failure to user interface 240.

where $\mu$ is the calculated running mean of the measured parameter, $\mu_w$ is the time-windowed mean of the measured parameter (at any given time), and $\mu_{w(n)}$ is the Nth time-windowed mean of the measured parameter.

Therefore, using the above algorithm, if at any given time, a time-windowed mean of a measured parameter is lower than a calculated running mean of the measured parameter, processor 230 communicates a caution or error signal to user interface 240. If processor 230 calculates three successive decreasing time-windowed means of a measured parameter, then processor 230 communicates a warning of impending laser failure to user interface 240.

For example, time axis 350 includes two indicators 351, 352 representative of two points in time. Between times 351 and 352, the time-windowed mean of the parameter ($\mu_w$ in Rule 1 above and curve 330 in FIG. 3) is less than the calculated running mean of the parameter ($\mu$ in Rule 1 above and curve 310 in FIG. 3). Therefore, according to Rule 1 in the algorithm above, processor 230 communicates a caution or error signal to user interface 240.

In another example, between the same times 351 and 352 of the previous example, three temporally consecutive time-windowed means of a measured parameter have decreased. Therefore, according to Rule 2 above, processor 230 communicates a warning of impending failure to user interface 240.

While the above algorithm has been explicitly defined above, the algorithm is intended merely as an example, and is not intended to be limiting on the present invention. Any number or variation of algorithms may be employed in the present invention. For example, any statistically significant calculation or comparison of a measured parameter, a running mean and/or variance of a measured parameter, and/or a time-windowed mean and/or variance of a measured parameter may be used to examine the operating status of a laser, to provide a diagnosis of the laser, and/or to predict an operating status of the laser.

User interface 240 can include any device capable of providing or configured to provide output from processor 230 in a human-readable manner. For example, user interface 240 can include a plurality of lights, or light-emitting diodes ("LEDs") that light up based on an output of processor 230. For example, a user interface 240 may present a series of LEDs that light up to represent relative measurements and levels of operating health of a laser.

In another example, user interface 240 can include any device that presents visual information, such as a monitor, CRT screen, or LCD display. User interface 240 can present a graphical representation of a detailed history and/or expected performance of a laser across various time periods. For example, user interface 240 can include a monitor that presents a graph plotting various measurements obtained by sensors in suite 210 across a user-input time period.

In another embodiment of the present invention, user interface 240 includes an interface that allows a user to download measurements, analyses of operating health and/or predictions of operating health of the laser system. For example, a service technician may download all laser output measurements over the past ten days onto a computer-readable media.

In another embodiment of the present invention, user interface 240 is connected to a computer or telephone network (not shown) and is capable of communicating with a user through the computer or telephone network. User interface 240 may therefore automatically contact a user when one or more events occur. An event may be any singular occurrence or a trend in measured parameters. For example, an event may include one or more measured parameters exceeding or falling below one or more thresholds, a history of one or more measured parameters showing an increase or decrease in the parameter(s) over time, or any other singular or statistically significant event. In this way, user interface 240 may automatically contact a service technician if a series of measurements obtained by sensor suite 210 demonstrate a gradual decline in the operating health of a monitored laser, for example.

In another embodiment of the present invention, user interface 240 is configured to automatically shut a laser system down based on at least a signal communicated from processor 230. For example, processor 230 may communicate a signal to interface 240 warning of impending failure of a laser. Interface 240 may then automatically turn the laser off.

Figure 4:
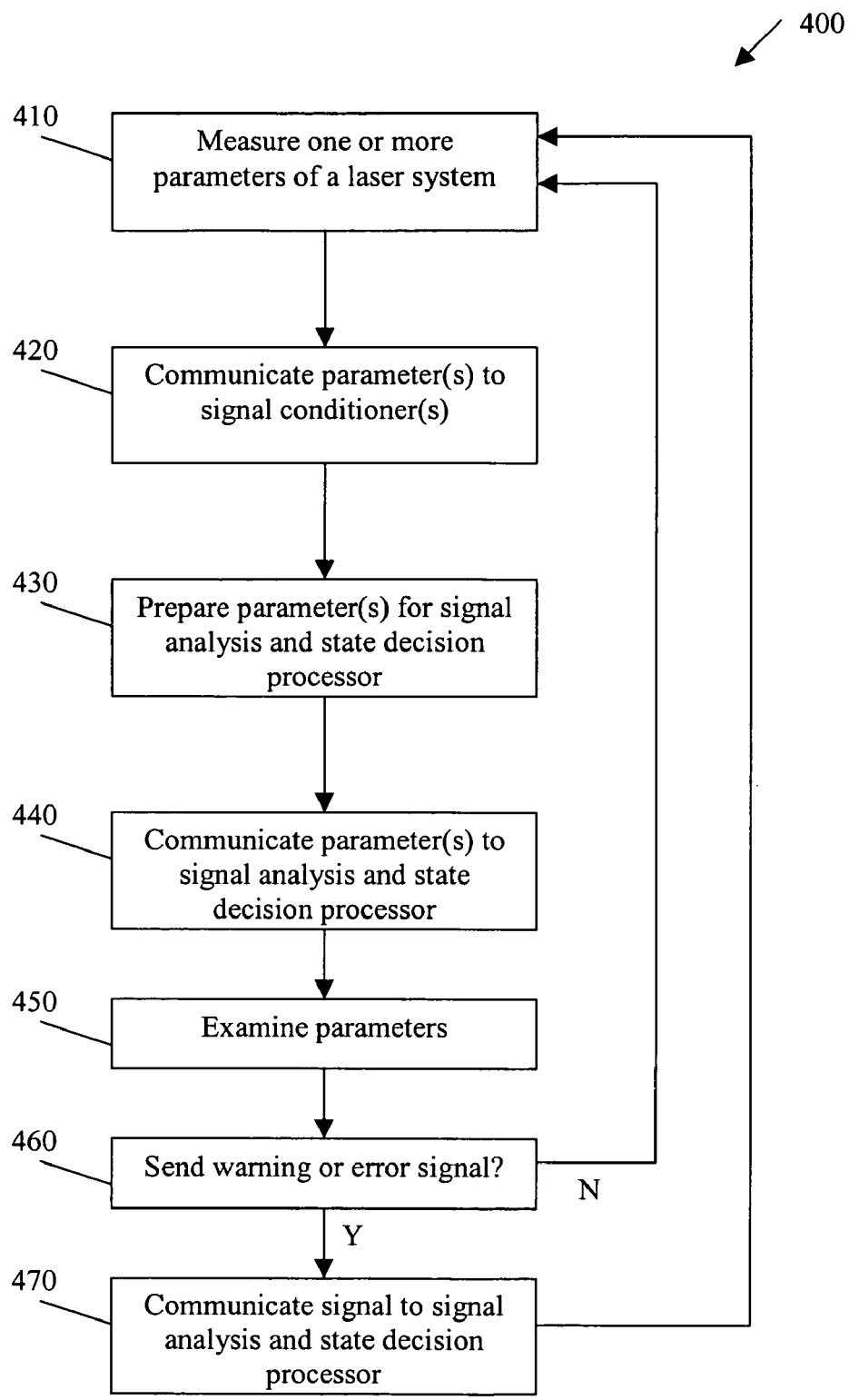
FIG. 4 illustrates a flowchart for a method of monitoring an operating health status of a laser in accordance with an embodiment of the present invention.

FIG. 4 illustrates a flowchart for a method 400 of monitoring an operating health status of a laser in accordance with an embodiment of the present invention. First, at step 410, one or more parameters of a laser system are measured. As described above, these parameters can include an optical power of a laser, a temperature of the laser, a temperature of a lasing medium exciting device, a power and/or energy supplied by the lasing medium exciting device, and an amount of current supplied to the lasing medium exciting device.

Next, at step 420, one or more of the measured parameters are communicated to one or more signal conditioners 250 through 290. As described above, the parameters may be communicated to signal conditioners 250 through 290 in order to prepare the parameters for communication to processor 230. At step 430, the parameters are prepared for communication to processor 230.

Next, at step 440, the parameters are communicated to processor 230. At step 450, the parameters are examined to determine one or more of a laser diagnostic and a prediction regarding the future operating health of the laser. As described above, the examination of parameters may be as simple as comparing a measured parameter to one or more thresholds, for example. Also as described above, the examination of parameters may include a mathematical or statistical analysis of one or more parameters, for example.

Based on at least the examination of parameters at step 450, at step 460 a determination is made as to whether a warning or error signal should be communicated. For example, as described above, a customizable algorithm may provide one or more rules to compare to one or more parameters and/or an analysis of the parameters. Based on at least this algorithm, a warning of impending failure or of any other problem with the laser system may be communicated to a user interface 240, for example. If it is determined at step 460 that a warning and/or error signal should be sent, then method 400 proceeds to step 470.

At step 470, the warning and/or error signal is communicated to a user interface 240. The warning and/or error signal may include any visual or audible notification to a user of the laser system. For example, the warning signal may include the flashing of one or more LEDs. Similarly, the warning may include a visual message displayed on a monitor.

In another embodiment of the present invention, as described above, the warning and/or error signal may be automatically communicated to a service technician. For example, based on at least the examination of parameters at step 450 and the determination of whether to send a warning/error signal at step 460, a request for service to the laser system may be automatically communicated to a service technician, as described above.

After step 470, method 400 proceeds back to step 410, where one or more parameters of the laser system are measured. Method 400 therefore may proceed in such a loop until the laser system is no longer used or no parameters are available for measurement.

On the other hand, if at step 460 it is determined that a warning and/or error signal should not be sent, method 400 proceeds back to step 410, where one or more parameters of the laser system are measured. Method 400 therefore may proceed in such a loop until the laser system is no longer used or no parameters are available for measurement.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. An apparatus for monitoring a laser, said apparatus including:
   a plurality of sensors including:
      an optical power sensor configured to measure an optical power of said laser;
      a first temperature sensor configured to measure a laser temperature and a lasing medium exciting device temperature; and
      a power sensor and a current supply sensor for said lasing medium exciting device; and
   a monitoring device capable of communicating with said plurality of sensors and configured to monitor an operating status of said laser and to determine a predicted health status of said laser,
   wherein said power sensor is configured to measure one or both of (i) an amount of excitation in a cavity of said laser by detecting a strength of an electric field at a feed point of said laser and/or (ii) an amount of excitation in a cavity of said laser, a forward radio frequency ("RF") power and a reverse radio frequency power supplied to said cavity.

2. The apparatus of claim 1, wherein said optical power sensor includes a thermal detector.

3. The apparatus of claim 1, wherein said first temperature sensor includes one or more of a thermocouple and a thermistor.

4. The apparatus of claim 1, further including a second temperature sensor configured to measure said lasing medium exciting device temperature,
   wherein said first temperature sensor is configured to measure said laser temperature.

5. The apparatus of claim 1, wherein said power sensor is configured to measure an amount of direct current supplied to said laser.

6. The apparatus of claim 1, wherein said power sensor is configured to measure an amount of excitation in a cavity of said laser.

7. An apparatus for monitoring a laser, said apparatus including:
   a plurality of sensors including:
      an optical power sensor configured to measure an optical power of said laser;
      a first temperature sensor configured to measure one or more of a laser temperature and a lasing medium exciting device temperature; and
      at least one of power sensor and a current supply sensor for said lasing medium exciting device; and
   a monitoring device capable of communicating with said plurality of sensors and configured to monitor an operating status of said laser,
   wherein said power sensor is configured to measure an amount of excitation in a cavity of said laser by detecting a strength of an electric field at a feed point of said laser.

8. An apparatus for monitoring a laser, said apparatus including:
   a plurality of sensors including:
      an optical power sensor configured to measure an optical power of said laser;
      a first temperature sensor configured to measure one or more of a laser temperature and a lasing medium exciting device temperature; and
      at least one of power sensor and a current supply sensor for said lasing medium exciting device; and
   a monitoring device capable of communicating with said plurality of sensors and configured to monitor an operating status of said laser,
   wherein said power sensor is configured to measure an amount of excitation in a cavity of said laser, a forward radio frequency ("RF") power and a reverse radio frequency power supplied to said cavity.

9. An apparatus for monitoring a laser, said apparatus including:
   a plurality of sensors including:
      an optical power sensor configured to measure an optical power of said laser;
      a first temperature sensor configured to measure one or more of a laser temperature and a lasing medium exciting device temperature; and
      at least one of power sensor and a current supply sensor for said lasing medium exciting device; and
   a monitoring device capable of communicating with said plurality of sensors and configured to monitor an operating status of said laser,
   wherein said power sensor is configured to measure an amount of excitation in a cavity of said laser, a forward radio frequency ("RF") power and a reverse radio frequency power supplied to said cavity,
   wherein said forward RF power and said reverse RF power are measured independently by a bi-directional coupler operatively connected to an output circuit of an RF driver.

10. The apparatus of claim 1, wherein said current supply sensor is configured to measure an electrical current supplied to said lasing medium exciting device.

11. The apparatus of claim 1, wherein an output from each of said sensors in said plurality of sensors is capable of being received by a signal conditioner before being communicated to said monitoring device.

12. The apparatus of claim 1, wherein said monitoring device is configured to determine at least one of a current health status and said predicted health status of said laser based on at least data obtained by one or more of said plurality of sensors.

13. The apparatus of claim 12, wherein at least one of said current health status and predicted health status is based on at least a statistical analysis of said data obtained by one or more of said plurality of sensors.

14. The apparatus of claim 12, further including a display device configured to indicate one or more of said current health status and predicted health status.

15. The apparatus of claim 1, wherein said plurality of sensors includes said power sensor and said current supply sensor.

16. A method for monitoring a laser, said method including:
   measuring an amount of excitation in a cavity of said laser; and
   determining a status of said laser based on said amount of excitation, wherein said amount of excitation is measured by one or more of (i) measuring an amount of radio frequency ("RF") excitation in said cavity, (ii) measuring an amount of radio frequency ("RF") excitation in said cavity by detecting a strength of an electric field at a feed point of said laser and/or (iii) measuring an amount of radio frequency ("RF") excitation in said cavity and a forward RF power and a reverse RF power supplied to said cavity.

17. The method of claim 16, wherein a temperature of said laser and said lasing medium exciting device are both measured.

18. A method for monitoring a laser, said method including:
   measuring an optical power of said laser;
   measuring a temperature of at least one of said laser and a lasing medium exciting device;
   measuring one or more of an amount of current supplied to said lasing medium exciting device and an amount of excitation in a cavity of said laser; and
   determining at least one of a current health status and predicted health status of said laser based on at least one of said optical power, said temperature of said laser, said temperature of said lasing medium exciting device, said current and said amount of excitation,
   wherein said amount of excitation is measured by measuring an amount of radio frequency ("RF") excitation in said cavity.

19. A method for monitoring a laser, said method including:
   measuring an optical power of said laser;
   measuring a temperature of at least one of said laser and a lasing medium exciting device;
   measuring one or more of an amount of current supplied to said lasing medium exciting device and an amount of excitation in a cavity of said laser; and
   determining at least one of a current health status and predicted health status of said laser based on at least one of said optical power, said temperature of said laser, said temperature of said lasing medium exciting device, said current and said amount of excitation,
   wherein said amount of excitation is measured by measuring an amount of radio frequency ("RF") excitation in said cavity by detecting a strength of an electric field at a feed point of said laser.

20. A method for monitoring a laser, said method including:
   measuring an optical power of said laser;
   measuring a temperature of at least one of said laser and a lasing medium exciting device;
   measuring one or more of an amount of current supplied to said lasing medium exciting device and an amount of excitation in a cavity of said laser; and
   determining at least one of a current health status and predicted health status of said laser based on at least one of said optical power, said temperature of said laser, said temperature of said lasing medium exciting device, said current and said amount of excitation,
   wherein said amount of excitation is measured by measuring an amount of radio frequency ("RF") excitation in said cavity and a forward RF power and a reverse RF power supplied to said cavity.

21. A method for monitoring a laser, said method including:
   measuring an optical power of said laser;
   measuring a temperature of at least one of said laser and a lasing medium exciting device;
   measuring one or more of an amount of current supplied to said lasing medium exciting device and an amount of excitation in a cavity of said laser; and
   determining at least one of a current health status and predicted health status of said laser based on at least one of said optical power, said temperature of said laser, said temperature of said lasing medium exciting device, said current and said amount of excitation,
   wherein said amount of excitation is measured by measuring an amount of radio frequency ("RF") excitation in said cavity and a forward RF power and a reverse RF power supplied to said cavity,
   wherein said forward RF power and said reverse RF power are measured independently.

22. The method of claim 16, wherein said current is measured by measuring an electrical current supplied to said lasing medium exciting device.

23. The method of claim 16, further including:
   converting one or more of said optical power, said temperature of said laser, said temperature of said lasing medium exciting device, said amount of current and said amount of excitation from a first signal to a second signal before said determining step.

24. The method of claim 16, wherein said determining step includes determining at least one of a current health status and said predicted health status, wherein at least one of said current health status and said predicted health status is based on at least one of said optical power, said temperature of said laser, said temperature of said lasing medium exciting device, said current and said driver power.

25. The method of claim 16, further including indicating one or more of said current health status and predicted health status.

26. The method of claim 16, wherein said amount of current supplied to lasing medium exciting device and said amount of excitation are measured.

27. A method for predicting an operating health of a laser, said method including:
   determining a plurality of parameters of said laser, said parameters including a temperature of said laser, a temperature of a lasing medium exciting device, and a laser output power, an amount of laser medium excitation, and a current supplied to said lasing medium exciting device, wherein said laser output power is measured by measuring one or both of (i) an amount of excitation in a cavity of said laser by detecting a strength of an electric field at a feed point of said laser and/or (ii) an amount of excitation in a cavity of said laser, a forward radio frequency ("RF") power and a reverse radio frequency power supplied to said cavity; and
   based on one or more of said parameters, providing one or more of a current and/or a future operating status of said laser.

28. The method of claim 27, wherein said determining step includes measuring said laser output power, said amount of excitation, said current, said laser temperature, and said temperature of said lasing medium exciting device.

29. The method of claim 27, wherein said providing step includes displaying one or more of said current and said future operating status.

30. The method of claim 27, wherein said providing step includes performing a statistical analysis of said parameters in order to determine one or more of said current and said future operating status.

31. The method of claim 30, wherein said statistical analysis includes one or more of a running mean and variance analysis and a windowed mean and variance analysis.

* * * * *